United States Patent [19]
Tang et al.

[11] Patent Number: 5,390,127
[45] Date of Patent: Feb. 14, 1995

[54] METHOD AND APPARATUS FOR PREDICTING POST-BUCKLING DEFORMATION OF SHEET METAL

[75] Inventors: Sing C. Tang, Plymouth; James C. Carnes, Willis, both of Mich.

[73] Assignee: Ford Motor Company, Dearborn, Mich.

[21] Appl. No.: 143,024

[22] Filed: Oct. 28, 1993

Related U.S. Application Data

[63] Continuation-in-part of Ser. No. 994,014, Dec. 21, 1992.

[51] Int. Cl.$^6$ .......................... G06F 15/46; B21D 5/02
[52] U.S. Cl. .................................. 364/472; 364/476; 29/34 R; 29/897.2; 72/347; 72/379.2
[58] Field of Search ............... 364/472, 476, 474.02; 72/347, 379.2; 29/DIG. 11, 897.2, 34 R, 33.5

[56] References Cited

U.S. PATENT DOCUMENTS

| | | | |
|---|---|---|---|
| 4,912,954 | 4/1990 | Vegter et al. | 72/8 |
| 5,128,877 | 7/1992 | Tang | 364/476 |

OTHER PUBLICATIONS

"Analysis of Sheet Metal Stamping by a Finite-Element Method.", by N.—M. Wang et al., Journal of Applied Mechanics, Mar. 1978, vol. 45, pp. 73–82.

"Sheet Metal Forming Modeling of Automobile Body Panels.", by S. C. Tang et al., ASM International, May, 1988.

"Application of Mechanics Methods to Evaluation of Forming and Process Design.", by T. Balun et al., SAE Technical Paper Series, Paper #930521, International Congress and Exposition, Detroit, Michigan, Mar. 1–5, 1993, pp. 181–187.

Computer Modeling of Sheet Metal Forming Process; Theory, Verification and Application, Wang et al, The Metallurgical Society, Inc., Apr. 1985, pp. 37–50.

*Primary Examiner*—Paul P. Gordon
*Attorney, Agent, or Firm*—Roger L. May; Joseph W. Malleck

[57] ABSTRACT

Method for predicting post-buckling deformation of a sheet of metal during a draw forming process, for use with a computer including memory, by introducing a set of springs to stabilize the sheet metal close to the onset of buckling, thereby enhancing convergence of numerical solutions. The method is for use with sheet metal forming tools including a draw die, a punch and binder having surfaces designed to form the sheet metal into a part, the sheet metal being represented as a mesh including a plurality of nodes. The method includes applying a displacement increment to the sheet metal nodes and identifying a singularity in a tangent stiffness matrix associated with the sheet metal close to the onset of buckling. The method also includes introducing a plurality of springs at the sheet metal nodes so as to eliminate the singularity and enhance convergence of the numerical solution of the displacement increment.

20 Claims, 13 Drawing Sheets

METHOD AND APPARATUS FOR PREDICTING POST-BUCKLING DEFORMATION OF SHEET METAL

CROSS-REFERENCE TO RELATED APPLICATION

This application is a continuation-in-part of U.S. patent application Ser. No. 07/994,014, filed Dec. 21, 1992, issued Jan. 3, 1995, Pat. No. 5,379,227, titled "Method For Aiding Sheet Metal Forming Tooling Design", assigned to the assignee of the present invention.

TECHNICAL FIELD

The present invention relates to a method and apparatus for predicting post-buckling deformation of sheet metal during a draw forming process.

BACKGROUND ART

The conventional or the stretch draw process to form a sheet into a part is generally divided into two stages: the binder-wrap stage and the die closure stage. The traditional method for sheet metal forming analysis is a quasi-static method. Due to the low speed of tool travel (e.g. less than 250 mm/S), the inertia effect of a thin sheet can be ignored. As a result, a quasi-static analysis can be justified and solved by the incremental method following the progress of tool movement.

A quasi-static analysis in three-dimensional space of the punch and die contact is described in the article titled "Analysis of Sheet Metal Stamping by a Finite-Element Method" authored by N. M. Wang and B. Budiansky, published by the Journal of Applied Mechanics, Vol. 45, No. 1, March 1978. The contribution of their method solved a contact problem in the quasi-static analysis by taking material derivatives of the contact forces. This, however, requires the curvature of tool surfaces, which is hard to obtain numerically. In addition, the coefficient matrix of the modified linear system governing the increment deformation of the sheet is no longer symmetric. The solution process was linearized by dividing the total tool travel distance into sufficiently small increments such that within a small interval the incremental equilibrium equation, which is approximately linear, could be solved. The method however, was based on the membrane shell theory, which has severe limitations, and the method cannot be applied to the analysis of a draw forming operation.

More recently, attempts have been made to analyze the punch and die contact utilizing crash worthiness programs based on an explicit time integration method. These programs are appropriate for structures dominated by an inertia load, such as the transient response to an automobile crash. As a result, the explicit time integration method yields inaccurate results for a sheet forming analysis without artificial adjustments for forming speeds and damping parameters which are problem dependent.

Due to severe discontinuities and the occurrence of structural instability, traditional numerical solutions often have convergence problems. A method and apparatus for addressing and resolving these convergence problems utilizing a more reliable implicit time integration method, so as to avoid undesirable oscillation in the transient response during forming, was developed and is described in issued U.S. patent application Ser. No. 07/994,014, filed Dec. 21, 1992, issued Sep. 1, 1994 (Pat. No. unassigned), titled Method For Aiding Sheet Metal Forming Tooling Design, assigned to the assignee of the present invention, the specification of which is hereby expressly incorporated by reference in its entirety.

In both the binder and die closure analysis, snap-through-type buckling may occur. Close to the onset of buckling, the tangent stiffness matrix in the Newton-Raphson method is ill-conditioned or singular because it reflects the stiffness of an unstable structure. This causes the iterative solution process to diverge because of the large nodal displacement increments that are computed based upon this matrix. Existing methods, such as the constant arc method, are insufficient since they do not address the contact problem. Accordingly, it would be desirable to address and resolve the divergence problems.

SUMMARY OF THE INVENTION

It is an object of the present invention to provide an improved method and apparatus for the analysis of the draw forming process of sheet metal.

It is a further object of the present invention to provide a method for the analysis of the draw forming process of sheet metal, such as the prediction of post-buckling deformation, for automotive sheet metal parts.

In carrying out the above object and other objects and features of the present invention, a method is provided for predicting post-buckling deformation of a sheet of metal during a draw forming process, for use with a computer including memory, and sheet metal forming tools including a draw die, a punch and binder having surfaces designed to form the sheet metal into a part, the sheet metal being represented as a mesh including a plurality of nodes. The method comprises applying a displacement increment to the sheet metal nodes and identifying a singularity in a tangent stiffness matrix associated with the sheet metal close to the onset of buckling. The method also comprises introducing a plurality of springs at the sheet metal nodes so as to correct for the singularity and enhance convergence of the numerical solution of the displacement increment. The method also comprises releasing the springs after convergence of the numerical solution of the displacement increment.

In one preferred embodiment, the springs are released by removing the spring forces from the nodes and removing the spring stiffness from a tangent stiffness matrix associated with the sheet metal. In a second preferred embodiment, the springs are released without removing the spring stiffness from the tangent stiffness matrix and a set of linear simultaneous equations for equilibrium at all nodes with springs is established according to:

$$\lambda_i - \sum_{j=1}^{n} k_j \delta_{ij} \lambda_j = k_i \delta_{0i}$$
$$(i = 1 \ldots n)$$

wherein $\delta_{ij}$ is the vertical deflection at a node i due to a unit vertical force at a node j in referring to the configuration of the sheet metal at that position of the tool with all springs in action, $\delta_{0i}$ is the vertical displacement at the node i after convergence of the iteration while there is a vertical spring at the node i, and n is the total number of springs introduced. The present invention is especially effective to treat snap-through type buckling.

A system is also provided for carrying out the methods.

The advantages accruing to the present invention are numerous. For example, the method solves convergence problems associated with numerical solutions of existing methodologies, resulting in an accurate prediction of post-buckling deformation.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
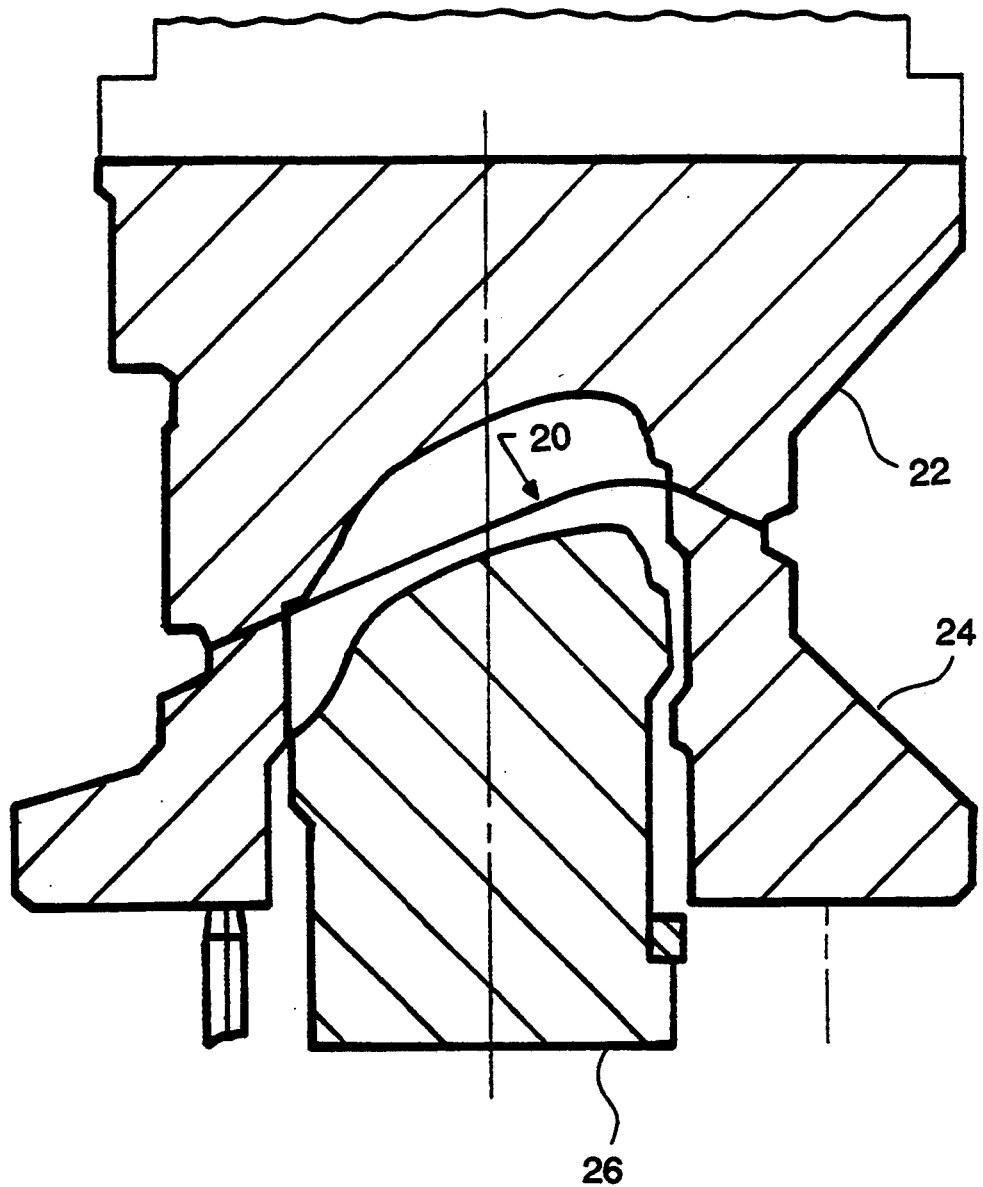
FIG. 1 is a sectional view of a stretch draw die apparatus for an automotive body panel in the binder wrap stage of the;metal forming process, the punch being in an inactive state.
Figure 2:
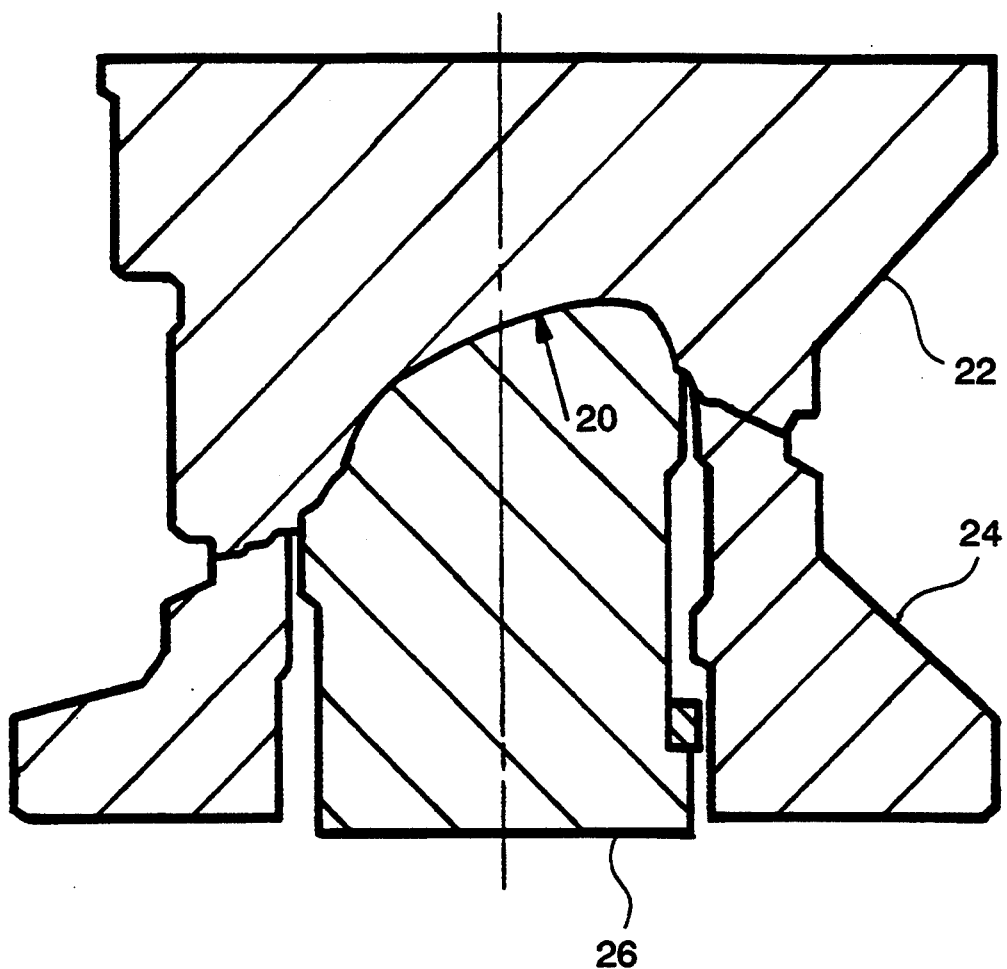
FIG. 2 is a sectional view of a stretch draw die apparatus for an automotive body panel in the die closure stage of the metal forming process, the lower punch being still in an inactive position, the upper die with a lower binder ring having descended and pressed the sheet onto the lower punch to form the part.

Referring now to FIGS. 1 and 2, there are shown sectional views of a stretch draw die apparatus for an automotive body panel in the binder wrap stage and the die closure stage, respectively, of a sheet metal forming process. In the binder wrap, or binder set, stage best shown in FIG. 1, the binder ring is closed and holds the perimeter of the sheet metal blank 20. The upper die 22, which is one piece with the upper binder ring, lowers onto the lower binder ring 24 which is floating in this stage, setting the binder shape. In the die closure stage best shown in FIG. 2, the lower binder ring 24 together with the upper binder ring and die 22, descends to press the sheet onto the stationary lower punch 26, forming the contoured automotive body panel. Although the drawing figures illustrate a stretch draw die apparatus, the present invention is equally applicable to other apparatus, such as a die apparatus of a conventional toggle draw. It should be noted that some buckling and/or wrinkling occurring during the forming can be stretched out before completion of the tool travel. Therefore, the part may still be formed without any defects. For outer panels, buckling and/or wrinkling on the part after forming is unacceptable. However, for some inner parts, buckling and/or wrinkling is acceptable after forming.

Figure 3:
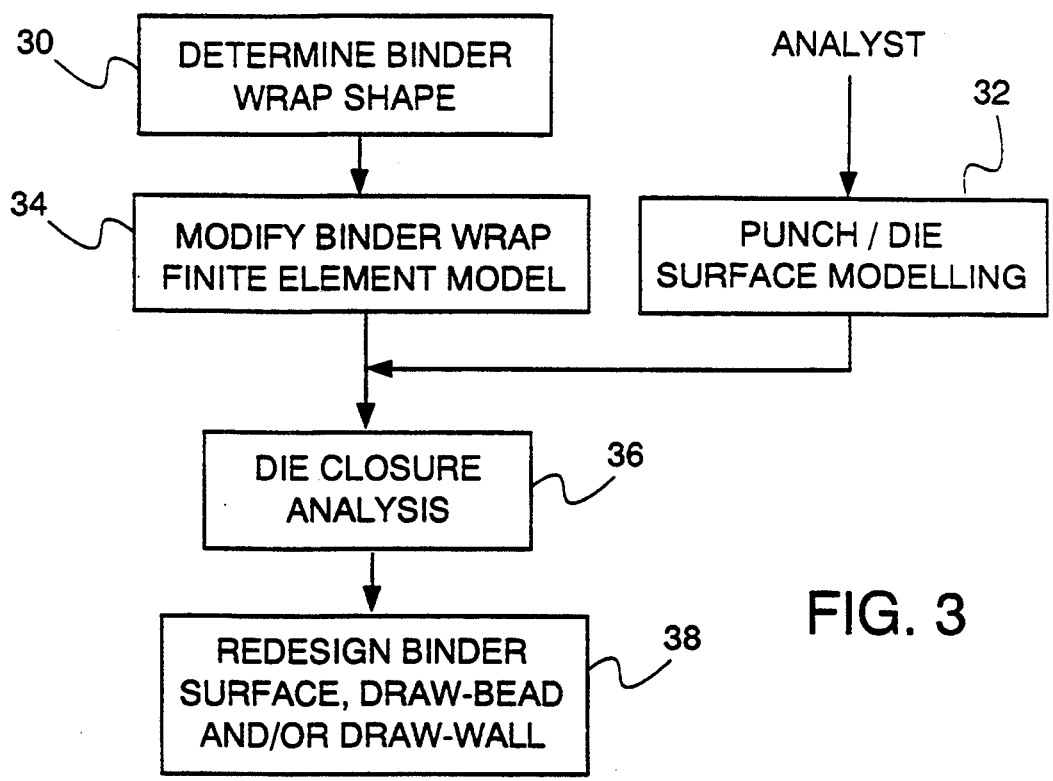
FIG. 3 is a general flowchart detailing the steps for prediction of deformation and stress distribution of the present invention.
Figure 4:
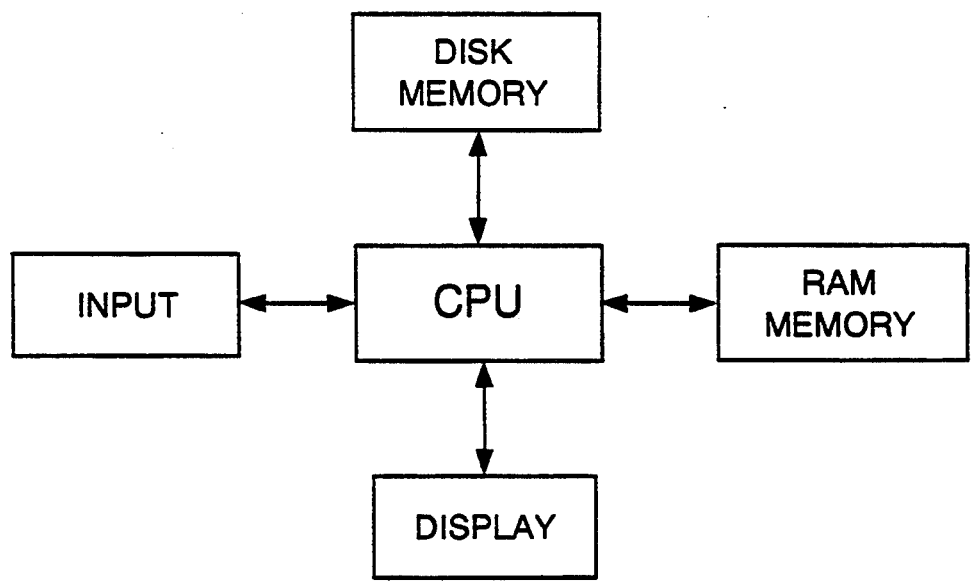
FIG. 4 is a block diagram of a computer for use with the present invention.

Referring now to FIG. 3, there is shown a flowchart detailing the steps for the prediction of the deformation and stress distribution in a draw blank of the present invention. The prediction is preferably carried out on a computer, such as a IBM RS6000 workstation, the functional block diagram of which is illustrated in FIG. 4. As shown in FIG. 4, the computer includes a CPU, a RAM or core memory, disk memory, a display or similar output, and an input means, such as a keyboard. The computer simulates the formation of automobile body panels from sheet metal. As shown, at step 30, the sheet metal deformation after binder wrap is determined. This step is necessary prior to performing die closure analysis, including prediction of sheet metal deformation and stress distribution during die closure.

After the binder wrap stage, visual analysis may show defects in binder design. For example, sheet metal draw blanks which are not initially contacted by the draw punch in a centralized location of the suspended portion of the blank are likely to form undesirable wrinkles in the blank when fully drawn. After the binder wrap stage shown in FIG. 1, the uncontacted, interior of the sheet metal blank is virtually suspended. Its deformed shape is complex, the result of the weight of the metal and the contact of the metal with the closed binder.

Having performed the binder wrap stage, the initial contact of the punch with the suspended portion of the sheet metal blank is known. This is critical to knowing whether any off-center contact will be made between the punch and the suspended portion. In the preferred embodiment, step 30 is performed according to the method of determining a binder wrap disclosed in U.S. Pat. No. 5,128,877, patented on Jul. 7, 1992 to Tang, and assigned to the assignee of the present invention, the specification of which is hereby expressly incorporated by reference in its entirety.

With continuing reference to FIG. 3, at step 32 punch and die surface modelling is performed. This surface modelling is achieved utilizing a software preprocessor, which could be written in the FORTRAN programming language, which transforms line data input from a designer. Typically, the designer creates binder line data and punch/die line data initially utilizing an appropriate CAD program. The line data represents the tool surfaces, such as the tool ridges and the like. In the preferred embodiment, the software preprocessor creates a triangular mesh establishing the connectivity of the tool surface, utilizing a nearest neighbor algorithm which fills in the surface between the points on the lines.

The tool surface triangular mesh is a plurality of interconnected triangles, the vertices of which are referred to as nodal points or nodes. Utilizing the nearest neighbor algorithm will sometimes cause inconsistency between the connectivity of the original line data and the resulting tool surface mesh, resulting in errors of shape, which are preferably corrected. The tool surface triangular mesh is then provided as an input to the die closure analysis of step 36, described in greater detail below, to test for contact between the tool surface and the sheet metal.

As shown in FIG. 3, at step 34, the binder wrap shaped finite element model determined at step 30 is modified by the software preprocessor at step 34. The binder wrap shape is also represented by a triangular mesh. During this modification step, the binder wrap finite element model mesh is refined. In other words, the analyst is allowed to alter the nodal positions of the mesh by varying the positions of the nodes. However, the modified nodal positions will still lie on the binder wrap surface determined at step 30, i.e. the surface of the binder wrap will stay the same. It should be appreciated by one of ordinary skill in the art that this modification provides the advantage of allowing the analyst to increase the density of nodes in particular areas, such as an area of high curvature, to more accurately predict strain concentration associated with the die closure stage of the metal forming process.

The step of modifying the binder wrap finite element model also preferably includes defining the constraining forces due to binder pressure and the draw-bead. Preferably, a function is defined wherein the input is nodal displacement and the corresponding output is the resulting opposing force on the node as the sheet metal is formed. Preferably, the constraining forces are modelled as an elastic-plastic spring. Still further, binder wrap finite element model modification of step 34 entails defining the sheet metal material properties, in addition to Young's modulus of elasticity and Poisson's ratio, material parameters in the plastic range, and defining the friction coefficient of the metal and the tool surfaces.

With continuing reference to FIG. 3, at step 36 die closure analysis is performed. Die closure analysis according to the present invention is shown in greater detail in the flowchart of FIGS. 5a–5c. In general, the method of the present invention involves solving a sequence of force balancing problems, referred to as load steps, upon the modified binder wrap triangular mesh. At each load step, the tool advances to a new position, causing boundary condition updates for the contacting nodes. There are two kinds of contacting nodes. Nodes contacting the punch/die surface are called contact nodes, whereas nodes inside the binder contacting the upper binder ring and the lower binder surface on the die are called binder nodes.

Figure 6:
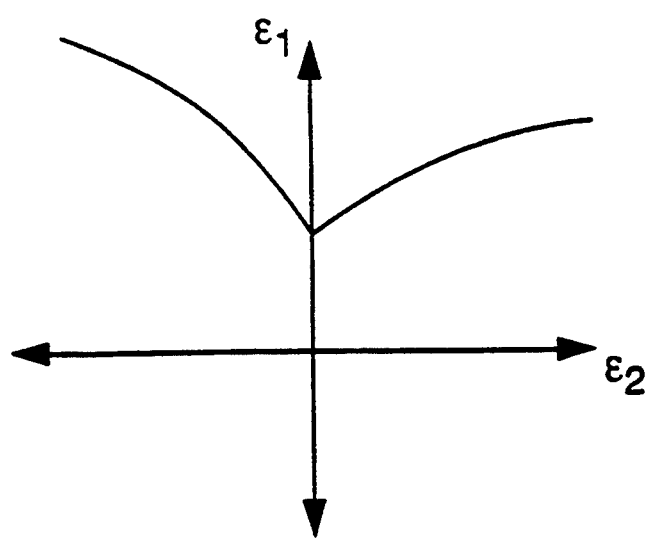
FIG. 6 is an illustration of a forming limit diagram for use with the present invention for determining unacceptable levels of strain.

At each load step, the computer searches for new nodal positions which satisfy the new boundary conditions and produce balanced internal forces and external forces (the spring and friction forces) at all nodes, i.e. until equilibrium is reached. These load steps are continued until the tool has advanced to its final position, and the automotive body panel has been formed. The search for new nodal positions is performed iteratively, with each iteration preferably producing a better result with a smaller unbalanced force. When the unbalanced force is small enough, the next load step begins and generates new boundary conditions again. Periodically during the analysis the predicted stress and deformation can be viewed to check defects such as potential permanent buckling and/or wrinkling. After the tool reaches its final position, the strain is checked to determine whether splitting or thinning of the sheet metal can occur. This can be done utilizing a forming limit diagram, such as that shown in FIG. 6 wherein $\epsilon_1$ represents the major principal strain and $\epsilon_2$ represents the minor principal strain, to detect high strain. If the strain is too high, the draw bead, binder shape and draw wall can be appropriately redesigned.

Figure 5A:
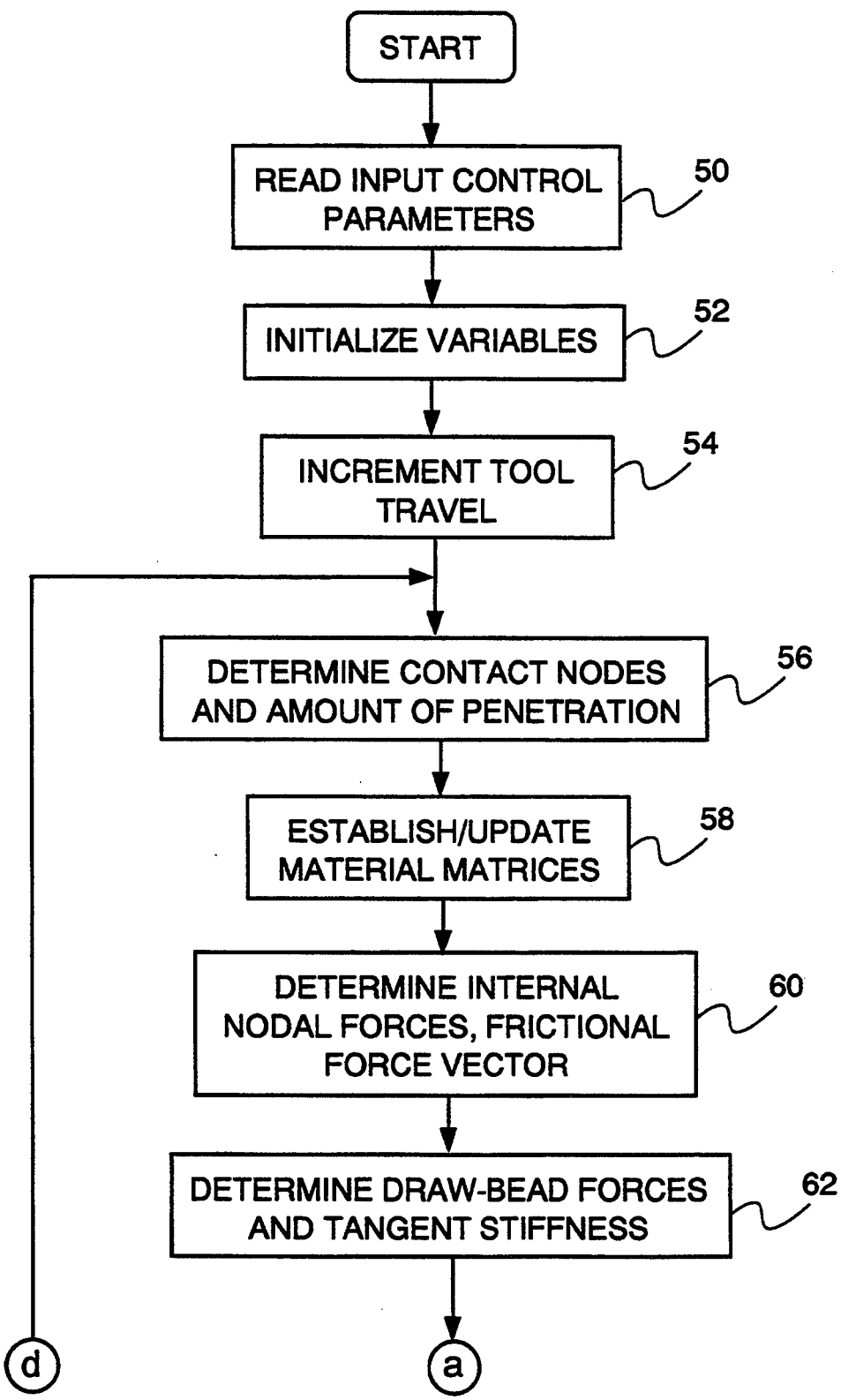
FIGS. 5a, 5b and 5c are detailed flowcharts illustrating the steps for die closure analysis according to the present invention.

As best shown in FIG. 5a, at step 50 the computer is provided with data from steps 32–34 and additional control parameters, such as tolerances. As previously described, this data includes the tool surface triangular mesh from step 32 and the modified binder wrap triangular mesh from step 34. Variables are initialized to predetermined and/or default values at step 52.

With continuing reference to FIG. 5a, at step 54 the tool is advanced an incremental amount, such as 1 mm for an outer body panel. As the tool advances, the tool surface contacts the sheet metal. At step 56, the computer determines the contact nodes between the tool surface mesh and the sheet metal mesh by measuring the penetration of sheet metal nodes into the tool surface. This penetration gives rise to a boundary condition which enforces a displacement increment on the contact nodes, forcing them to the tool surface.

Figure 7A:
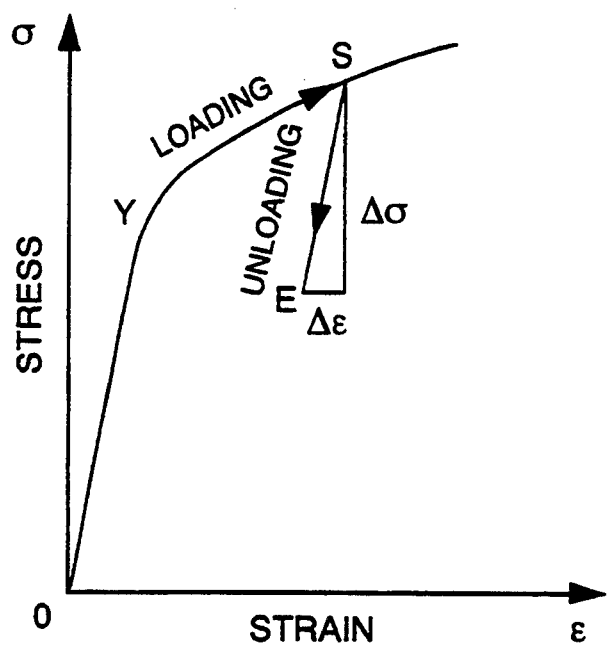
FIGS. 7a–7b are illustrations of loading and unloading paths for determining stress increments.

As shown in FIG. 5a, at step 58 the material matrices, i.e. the stress-strain relationships, are established/updated so as to ensure accuracy. To form a complex body panel, there may be stress unloading in the panel even before the tool reaches the final position. As best shown in FIG. 7a, path OYS represents loading and path SE represents unloading. Before the stress state can be determined, at a sampling point in the sheet detected under an unloading condition, the elastic-plastic material matrix is utilized to establish the tangent stiffness matrix, the determination of which is fully described in the paper titled "Sheet Metal Forming Modeling of Automobile Body Panels" by S. C. Tang, J. Gress and P. Ling, published in 1988 by ASM International at the Controlling Sheet Metal Forming Processes 15$^{th}$ Biennial Congress, which is hereby expressly incorporated by reference in its entirety. Once the displacement increment is solved utilizing a tangent stiffness matrix mentioned in the paper and explained in greater detail below, the strain increment at that sampling point can be obtained, based on a known strain and displacement increment relationship. The stress increment is then computed by a known assumed stress-strain increment relationship. If the computed equivalent stress increment is negative, the stress state at that point is under unloading, and the stress increment is preferably recomputed by the pure elastic stress-strain relationship according to the elastic-plastic theory.

Since the elastic-plastic material matrix, which is very soft, is used in the tangent stiffness matrix, the displacement increment and thus the strain increment would be large. After detecting unloading, existing methodologies determine the stress change ($\Delta\sigma$) from the strain increment, based on the increment elastic stress-strain relationship. The resultant stress change is, however, large even for a small change in strain ($\Delta\epsilon$), as shown in FIG. 7a. Due to this large change of the stress, it is difficult to obtain convergence using iterations to obtain equilibrium because of the inconsistency in using the elastic-plastic material matrix in establishing the tangent stiffness matrix and using the pure elastic material matrix in computing stress after the displacement increment and strain increment have been determined.

Alternatively, one may repeat the load step to set the pure elastic (instead of the elastic-plastic) material matrix in establishing the tangent stiffness matrix. However, resetting the material matrix works for sheets with only a few sampling points. To model a complex part for forming analysis requires several thousand sampling points to obtain an accurate result. Because of the interaction among the sampling points, it is difficult to be consistent for the material matrix, i.e., either pure elastic or elastic-plastic material matrix used in both establishing the tangent stiffness matrix and computing the stress increment after the solution, at every sampling point.

Figure 7B:
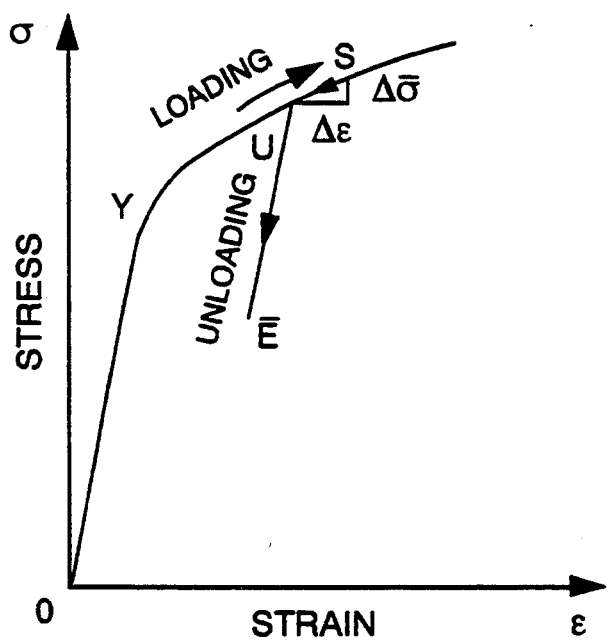

Accordingly, in the preferred embodiment, a stress change based on the incremental deformation theory of plasticity is used in the computation of the stress increment after detecting unloading, as shown in FIG. 7b. The subsequent stress increment will be small, even for larger changes in the strain. After this load step, a regular unloading process might be applied as shown if unloading continues. The stress-strain relationship in the incremental solution for the next load step will be consistent with that used in the computation of the stress increment, and the internal nodal force F by the principle of virtual work. As a result, convergence of the numerical solution is enhanced. If unloading continues, however, the normal change to the elastic state will occur. On the other hand, when loading occurs, the tangent stiffness matrix follows the flow theory of plasticity.

As is known, the stress-strain relationship for the flow theory of plasticity, in rate form, is as follows:

$$\dot{\epsilon}_{\alpha\beta} = \dot{\epsilon}^e_{\alpha\beta} + \dot{\epsilon}^p_{\alpha\beta} \tag{2}$$

wherein $$\dot{\epsilon}^e_{\alpha\beta} = \frac{1}{E}[(1+\nu)G_{\alpha\gamma}G_{\beta\delta} - \nu G_{\alpha\beta}G_{\gamma\delta}]\dot{\sigma}^{*\gamma\delta} \tag{3}$$

and $$\dot{\epsilon}^p_{\alpha\beta} = \frac{F}{E} \frac{1}{\sigma_e^2} \left(\frac{1+2R}{1+R}\right)^2 \tag{3}$$

$$\left[G_{\alpha\rho}G_{\beta\gamma}\sigma^{\rho\gamma} - \frac{R}{R+1}G_{\alpha\beta}G_{\rho\gamma}\sigma^{\rho\gamma}\right]$$

$$* \left[G_{km}G_{ln}\sigma^{mn}\dot{\sigma}^{*kl} - \frac{R}{R+1}G_{mn}\sigma^{mn}G_{kl}\dot{\sigma}^{*kl}\right]$$

wherein E is Young's modulus, $F = E/E_t(\sigma_3) - 1$, $E_t(\sigma_e)$ is the tangent modulus at the equivalent stress level $\sigma_e$ in the uniaxial stress-strain curve, R is the transversely anisotropic parameter, $G_{\alpha\beta}$ is the metric tensor for the surface, and $$\sigma^{*\alpha\beta} = \sigma^{\alpha\beta} + G^{\alpha\gamma}\sigma^{\beta\delta}\epsilon_{\gamma\delta} + G^{\beta\gamma}\sigma^{\alpha\beta}\epsilon_{\gamma\delta} \tag{4}$$

and $$\sigma_e^2 = \tag{5}$$

$$\frac{1+2R}{1+R}\left[G_{\alpha\rho}G_{\beta\gamma}\sigma^{\alpha\beta}\sigma^{\rho\gamma} - \frac{R}{1+2R}G_{\alpha\beta}\sigma^{\alpha\beta}G_{\rho\gamma}\sigma^{\rho\gamma}\right]$$

Rearranging equations (1) through (5), the stress-strain relationship for the flow theory of plasticity can be rewritten in increment form as $\{\Delta\epsilon\} = [C]\{\Delta\epsilon\}$. For the incremental (decremental) deformation theory, E is replaced by the secant modulus $E_S$ and $\nu$ is replaced by $\nu_S$, wherein $$\nu_s = \nu \frac{E_s}{E} + \frac{R}{1+R}\left(1 - \frac{E_s}{E}\right) \tag{6}$$

Inverting the matrix yields the material matrix used in the finite element analysis (displacement method): $\{\Delta\epsilon\} = [D]\{\Delta\epsilon\}$, wherein $[D] = [C]^{-1}$. It should be noted that the incremental deformation theory of plasticity is utilized only at the transition from the plastic to the elastic state. Otherwise, the flow theory is utilized.

Referring once again to FIG. 5a, at step 60 the internal nodal forces and the frictional force vector for each contact node are determined. In the preferred embodiment, the nodal forces for each element are computed based on the updated material matrix. Internal nodal forces (there are no external forces acting for the die closure analysis except at the contact nodes) are computed by assembling all element nodal forces. For free nodes (nodes that are not contacting), the internal nodal forces F are equal to the unbalanced forces since there are no external forces. For contact nodes, the frictional forces T, which can be considered as the external forces at the contact nodes, are determined, as well as positional constraints holding the node on the tool surface. In the preferred embodiment, the frictional forces T are determined based on the Coulomb friction law:

$$T = -\frac{\mu\rho V}{|V|} \tag{7}$$

where $\mu$ is the coefficient of friction, $\rho$ is the normal pressure and V is the relative velocity vector of a contact node with respect to a tool surface in the finite element model.

Figure 8:
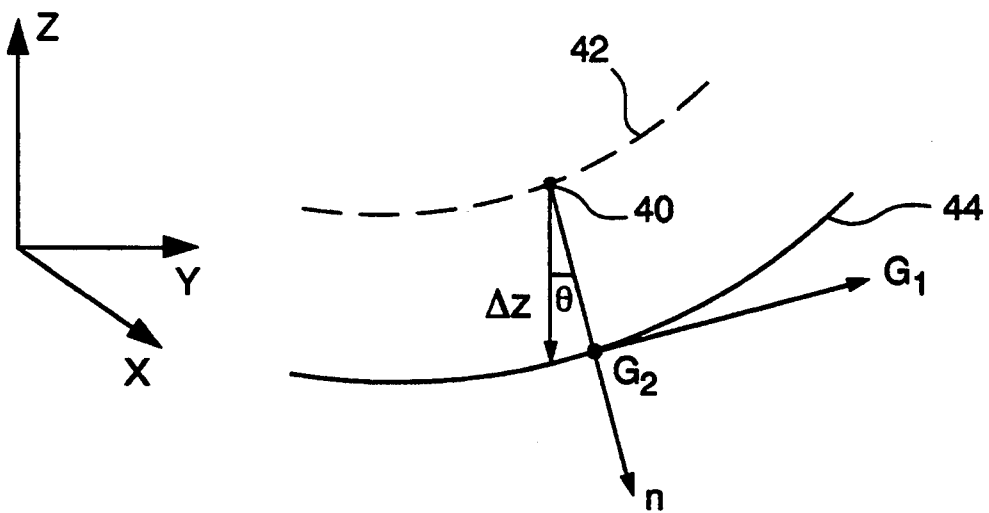
FIG. 8 is an illustration of sheet metal movement due to tool travel and an associated local Cartesian coordinate system for determining frictional force.

As shown in FIG. 8, a local Cartesian coordinate system can be established with the normal n and two tangent vectors $G_1$ and $G_2$ to the tool surface at the contact node 40. Dashed line 42 represents the sheet at time t whereas solid line 44 represents the punch at time $t + \Delta t$. Positional constraints hold the node in this tangent plane, determined by $G_1$ and $G_2$ at that instant. It should be noted that the frictional force T lies on the tangent plane determined by the vectors $G_1$ and $G_2$. To compute the normal n, only the slopes of the tool surface are required. To constrain a contact node slide along the tool surface, (i.e. $|V|$ much different from 0), a boundary value problem is formulated with the displacement increment as:

$$\Delta z^* n = |\Delta z| * \cos\theta \tag{8}$$

where $|\Delta z|$ is the amount of penetration into the tool surface in the z-direction, specified along n and the external forces $T^* G_i$ specified along $G_i$ with $i = 1,2$. In the load step, an iterative process to solve for equilibrium, expressed approximately by the linear system:

$$K_t^* \Delta\Delta U = T - F \tag{9}$$

where F is the internal nodal force due to deformation at a contact node, can be performed until the right hand side is zero, i.e., equilibrium is satisfied at each load step.

It should be appreciated that during this process, the tangent stiffness matrix $K_t$ will be kept symmetrical.

Figure 12:
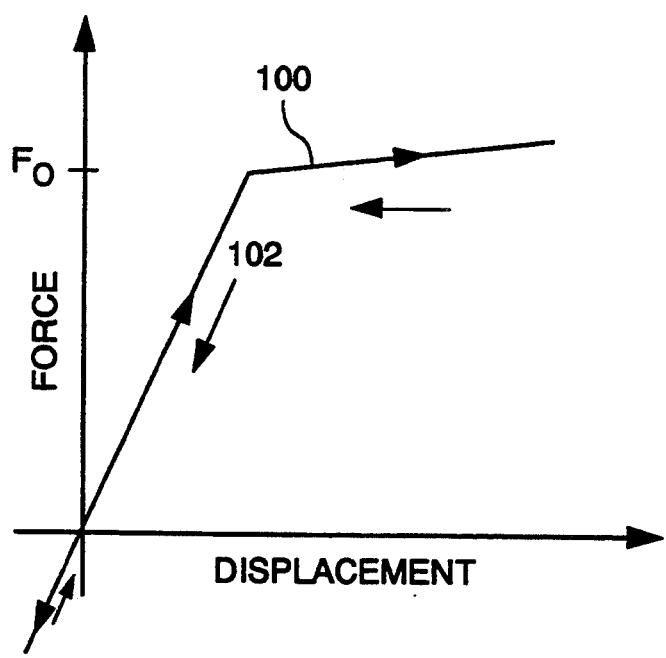
FIG. 12 is an graphical illustration of a nonlinear elastic spring for use with the present invention for modelling a draw-bead.
Figure 13:
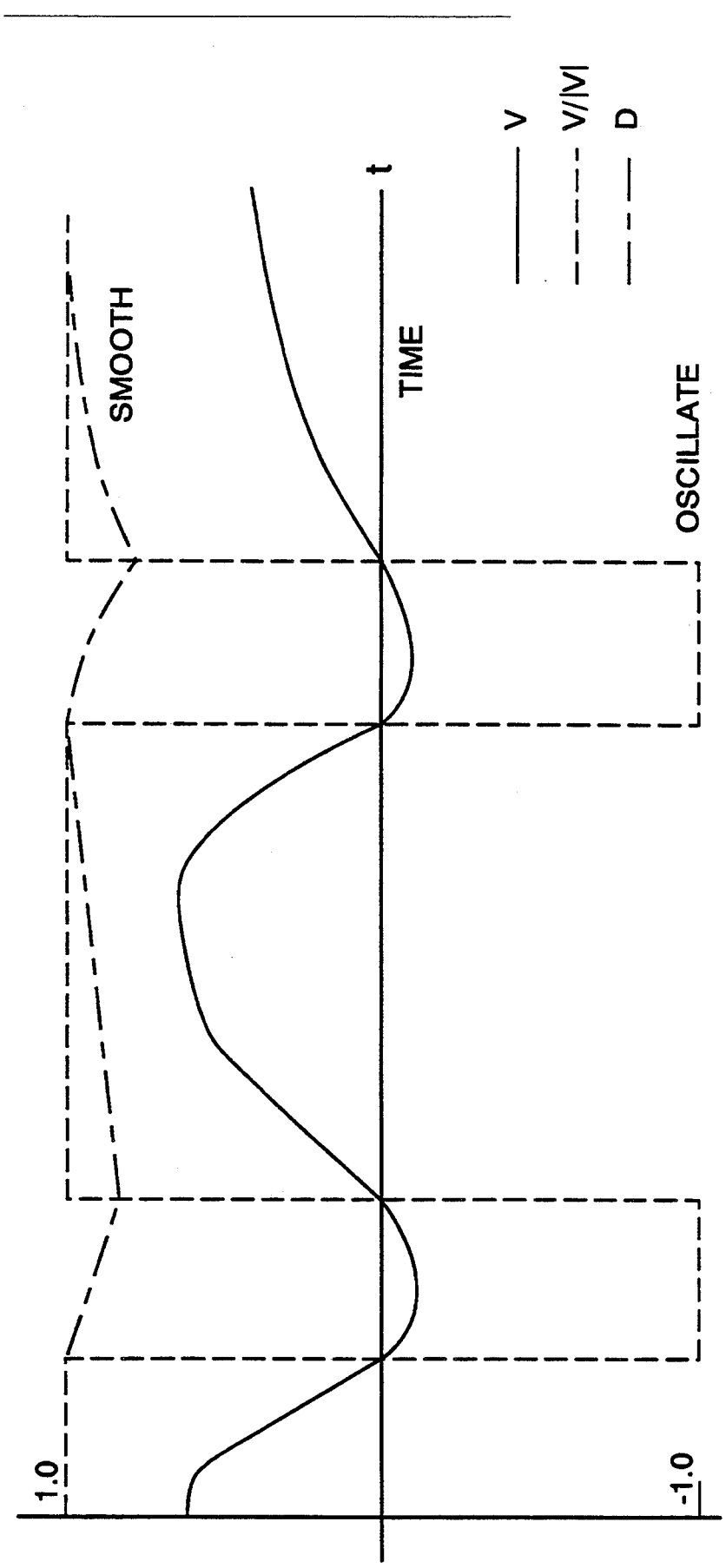
FIG. 13 is a graphical illustration of the filtered relative velocity vector (D) of the present invention to smooth discontinuities in the relative velocity vector $(V/|V|)$.

With reference to FIG. 5a, at step 62 the draw-bead forces and the tangent stiffness of the equivalent spring for the draw-bead are determined. The draw-bead is preferably modelled by a line of nonlinear springs which have been discretized and attached to nodes of the periphery of the sheet metal. These nonlinear springs can be characterized as shown in FIG. 12 where direction 100 indicates loading and direction 102 indicates unloading of the springs. Spring force $F_o$ is determined analytically or by experiment. As shown in FIG. 12, in the flat region of the spring function, a small slope is introduced to make the tangent stiffness matrix non-singular (i.e. the solution to the linear system is unique). A line of nonlinear elastic springs are preferably used instead of an elastic-plastic spring, which would cause oscillations in the quasi-static solution during the analysis of the forming process due to the same type of inconsistency as in the material properties.

Figure 5B:
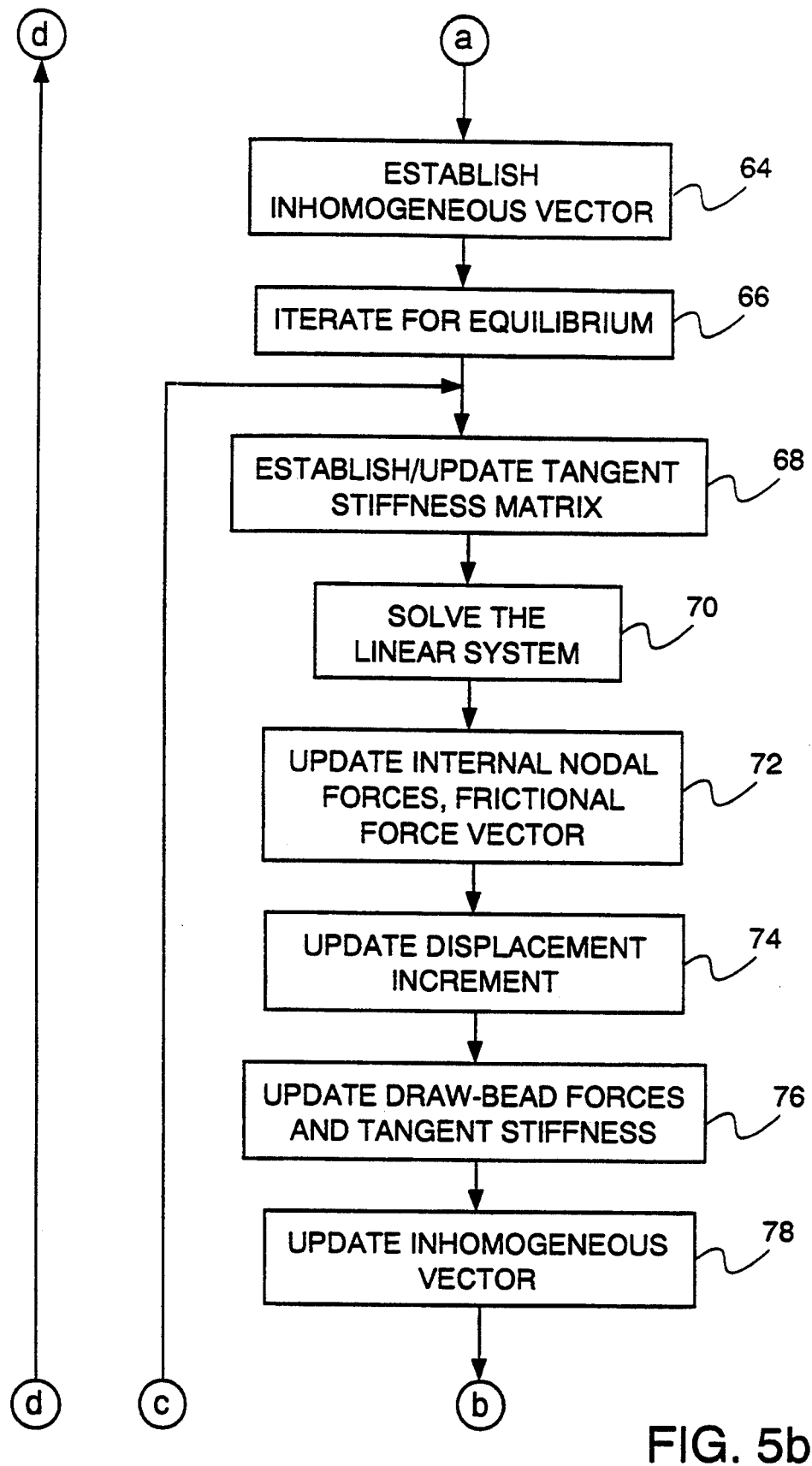

Referring now to FIG. 5b, at step 64 the inhomogeneous vector (T−F), also called the right-hand side vector, for the linear system of the incremental equilibrium equations is established. At step 66, an iteration for equilibrium is initiated. In the preferred embodiment, the iteration involves force balancing utilizing the Newton-Raphson method. At step 68, the tangent stiffness matrix is established/updated for each element, utilizing the material matrix described above with reference to step 60. All elemental tangent stiffness matrices are assembled to form a global tangent stiffness matrix $K_t$. Step 68 also involves the transformation of $K_t$ to the local Cartesian coordinate system associated with each contact node. The diagonal elements of the global tangent stiffness matrix are then modified, to take care of displacement boundary conditions, to obtain a modified global tangent stiffness matrix, $K_{tm}$. These displacement boundary conditions include constraints due to symmetry. Another boundary condition is that nodes inside the binder ring must contact the binder surface. For contact nodes, normal displacement is specified to be the amount of penetration in the normal direction of the tool surface for the first iteration and zero for subsequent iterations, since the normal displacement is satisfied and only the equilibrium in the tangential direction is not satisfied. Lastly, step 68 entails similarly transforming the inhomogeneous vector T−F to the local Cartesian coordinate system for contact nodes and, modifying the inhomogeneous vector to take care of the displacement boundary conditions, to obtain a modified inhomogeneous vector P. It should be appreciated that a set of linear simultaneous equations are established at step 68.

In each load step, an iterative process is used to find the displacement increment ($\Delta U$) so as to satisfy the equilibrium. The corrections to the displacement increment ($\Delta \Delta U$), which occur every iteration, are expressed by the following linear system and solved at step 70:

$$K_{tm} * \Delta \Delta U = P \qquad (10)$$

Thus, an estimated change in position is obtained by solving the stiffness equation for $\Delta \Delta U$. Preferably, the simultaneous equations are solved by the Gaussian elimination method.

Figure 9:
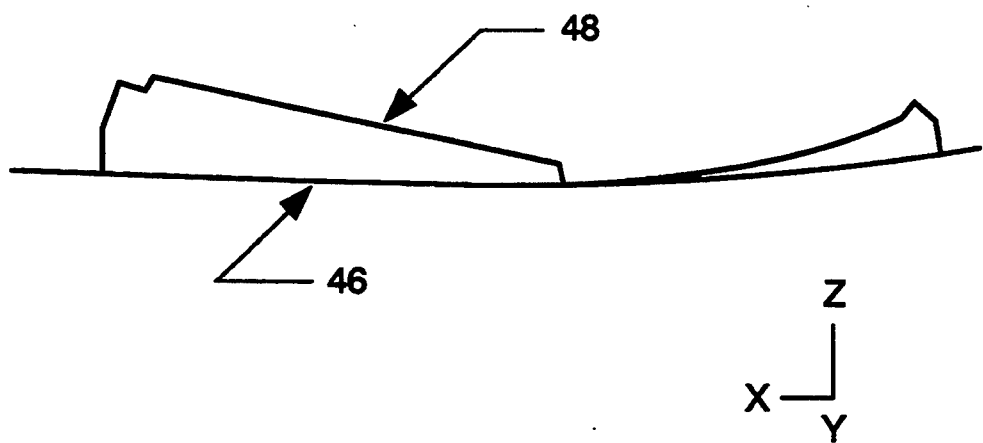
FIG. 9 is a sectional view illustrating a sheet metal in the binder wrap stage in both a generally convex shape and in the desired final shape.
Figure 10A:
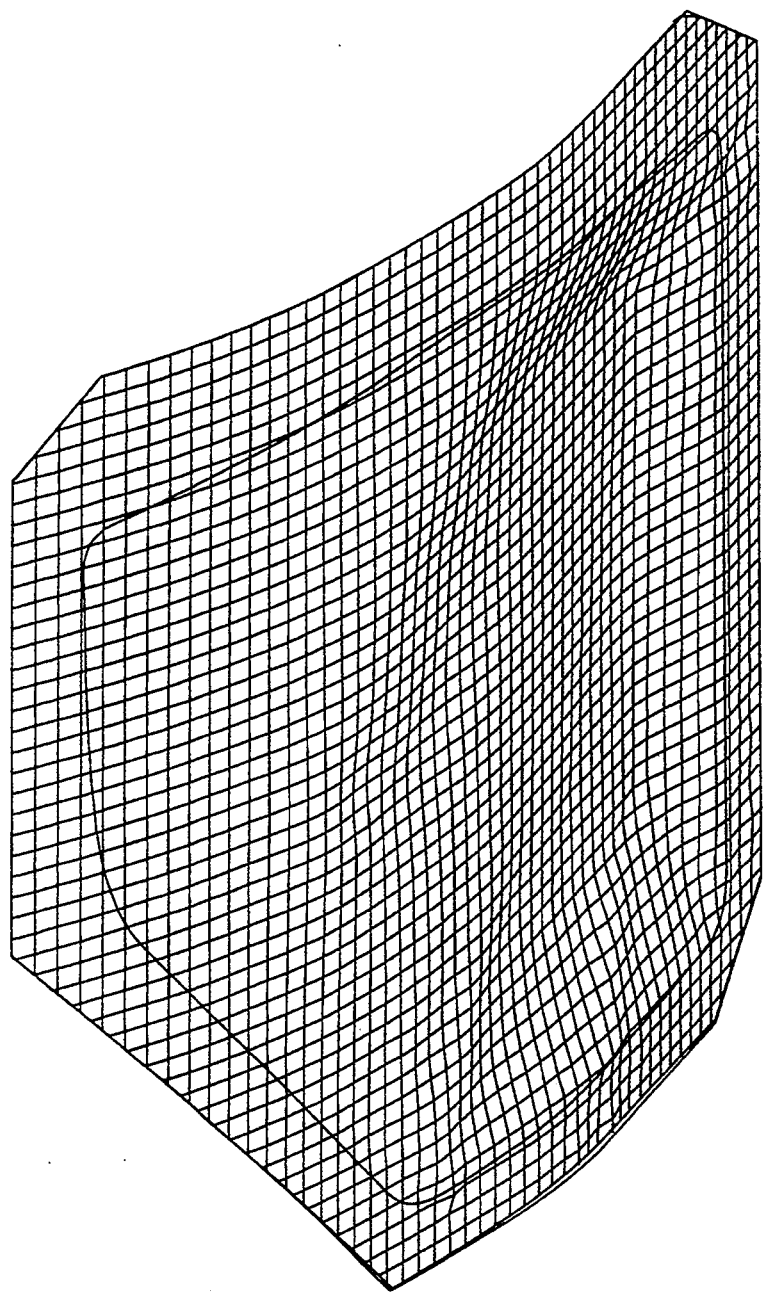
FIGS. 10a–10b are graphical illustrations of a sheet of metal for an inner automotive body panel at different positions of upper die travel, illustrating the sheet metal at the initiation of snap-through buckling and after snap-through buckling has occurred, respectively.
Figure 10B:
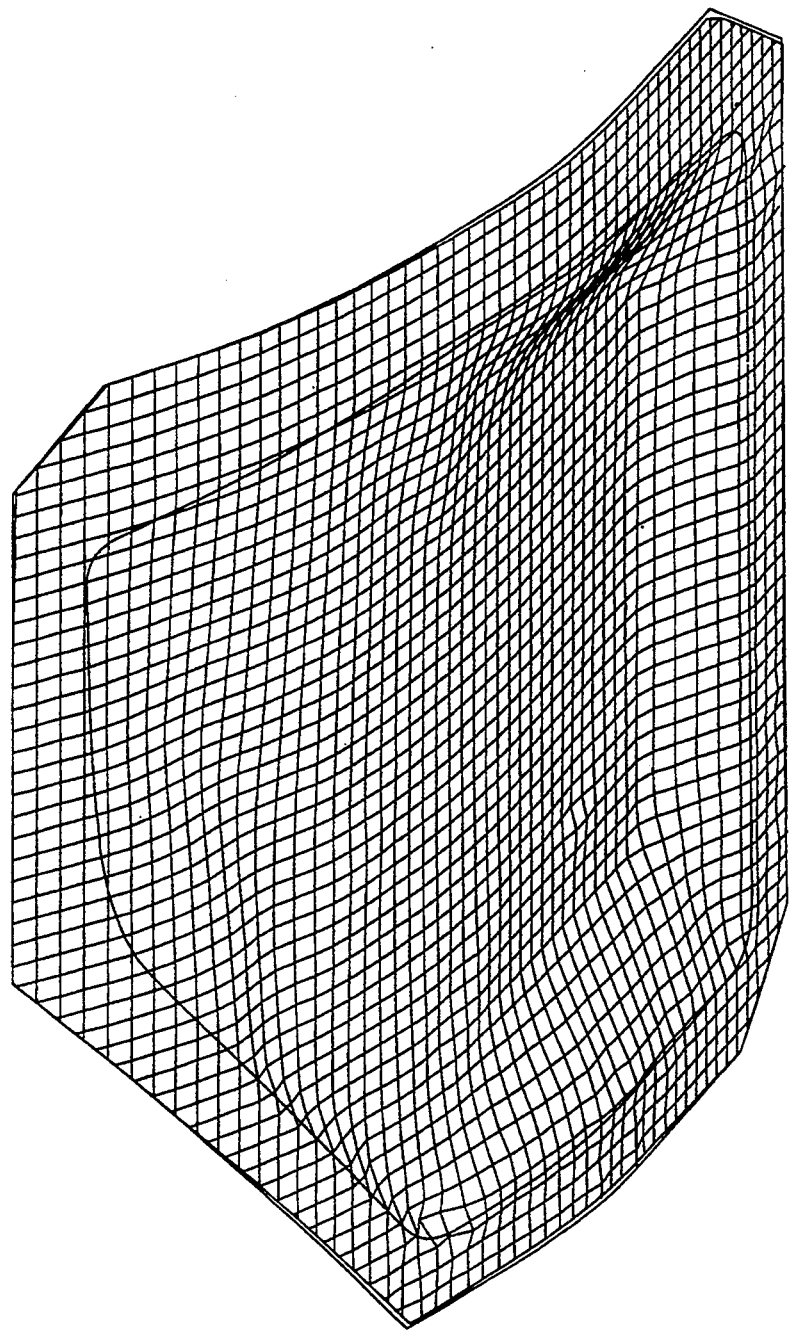

Referring to FIG. 9, there is shown a sectional view of sheet metal in the binder wrap stage 46, first in a generally convex shape (relative to the punch), and then in the final shape 48 after die closure. During this process, a structural instability gives rise to a singularity in the tangent stiffness matrix. As the sheet metal is formed, and it approaches a transition from a generally convex shape to a generally concave shape, the determinant of the tangent stiffness matrix approaches zero. In the discrete time simulation of forming, if such an ill-conditioned matrix is produced, unrealistically large values of $\Delta \Delta U$ would result which would cause divergence of the solution, ending the simulation. For example, referring now to FIGS. 10a-10b, there is shown a graphical representation of an inner automotive body panel (a vehicle door). In FIG. 10a, which shows the sheet metal at about 40% of upper die travel, the sheet is pushed on its convex surface by the lower punch and the onset of snap-through buckling can be seen. Inner panels are often given a convex shape relative to the punch so that extra metal will be available to avoid splitting during the stamping process. FIG. 10b, which captures the sheet metal at about 60% of upper die travel, illustrates the sheet after snap-through buckling has occurred.

Figure 11:
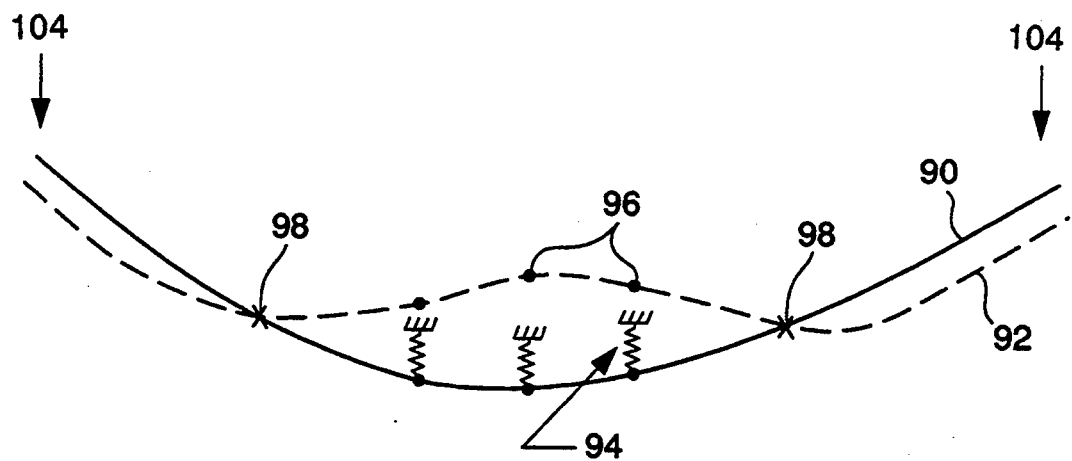
FIG. 11 illustrates a sheet of metal both before buckling and after buckling, and illustrates a sample placement of three springs.

In the preferred embodiment, a set of modified tangent stiffness equations representing the large nodal displacement at that instant is introduced at that load step, to allow the simulation to proceed to another die position wherein there may be no singularities. Preferably, the added stiffness is in the form of a temporary spring in the vertical direction. It should be noted that these temporary springs are not the same spring as mentioned above with reference to the draw bead. FIG. 11 illustrates a sheet of metal both before buckling as indicated by solid line 90, and after buckling, as indicated by dashed line 92. The upper die moves in the direction of arrows 104 while the lower punch remains stationary. FIG. 11 also illustrates a sample placement of three springs.

With continuing reference to FIG. 11, most preferably the set of weak springs 94 is introduced in the vertical direction at free nodes 96 (nodes that are not contacting the binder ring or a tool surface as are contact nodes 98) in the finite element model, so that the sheet will be stabilized by controlling the transition rate of the sheet metal. By utilizing these springs, the singularities in the tangent stiffness matrix at the onset of snap-through buckling can be avoided. For the analysis of stage 1 (binder-wrap), such springs may be required at all free nodes inside the punch opening, because there is no support on the sheet during this stage. However, for the analysis of stage 2 (die closure), addition of such springs is only required for free nodes where increments of deflection are large (e.g. five times the increment of the tool movement).

Once springs are applied and the iteration for the present increment of tool movement converges, the added springs must be released. The present invention contemplates two methods for releasing the added springs so that the sheet is free from any artificial interference.

In the preferred embodiment, according to the first method for releasing the springs, the spring forces are removed while simultaneously removing the spring stiffness from the tangent stiffness matrix. Thus, this method releases the springs by eliminating the spring stiffnesses from the stiffness matrix and simultaneously adding the equal and opposite forces to the spring forces on the right-hand side vector. At that point, the tangent stiffness matrix can be factored in the normal manner to obtain the final displacement increments of the nodes. Since the system is nonlinear, some unbalanced force will exist after release of the springs which is forwarded to the next increment of tool travel. Restated, the first method of release operates by removing the springs.

In the preferred embodiment, according to the second method for releasing the springs, the springs are released in a manner which avoids removing the spring stiffness from the stiffness matrix by applying forces on the spring nodes which effectively neutralize them.

Assume $\lambda_i$ is the vertical force required to release spring $k_i$ at node i such that there is no constraint or external force acting at node i. A set of linear simultaneous equations for equilibrium at all nodes with springs can be established:

$$\lambda_i - \sum_{j=1}^{n} k_j \delta_{ij} \lambda_j = k_i \delta_{0i} \quad (13)$$
$$(i = 1 \ldots n)$$

wherein $\delta_{ij}$ is the vertical deflection at node i due to a unit vertical force at node j in referring to the configuration of the sheet at that position of the tool with all springs in action, $\delta_{0i}$ is the vertical displacement at node i after convergence of the iteration, while there is a vertical spring at the node i, and n is the total number of springs added. The load factors (vertical forces) $\lambda_i$ (i=1 ... n) can be solved and the additional deflections in the vertical direction can be computed by imposing $\lambda_i$ at node i. Because the system is nonlinear, some unbalanced force will exist after release of the springs, which is forwarded to the next increment of tool travel.

With continuing reference to FIG. 5b, at step 72, the internal nodal forces and the frictional force vector for each contact node is updated. This updating includes the operations discussed above with reference to step 60, except the material matrices are not updated and the directions of the frictional forces are not changed.

At step 74 of FIG. 5b, the displacement increment $\Delta U$ is updated as follows:

$$\Delta U = \Delta U + \Delta \Delta U \quad (11)$$

At step 76, the draw-bead forces and the tangent stiffness of the equivalent spring for the draw-bead are updated. As previously discussed With reference to step 62, the draw-bead is preferably modelled by a line of nonlinear elastic springs, the springs having a spring characteristic best shown in FIG. 12. At step 78, the inhomogeneous vector P is updated for the linear system.

Figure 5C:
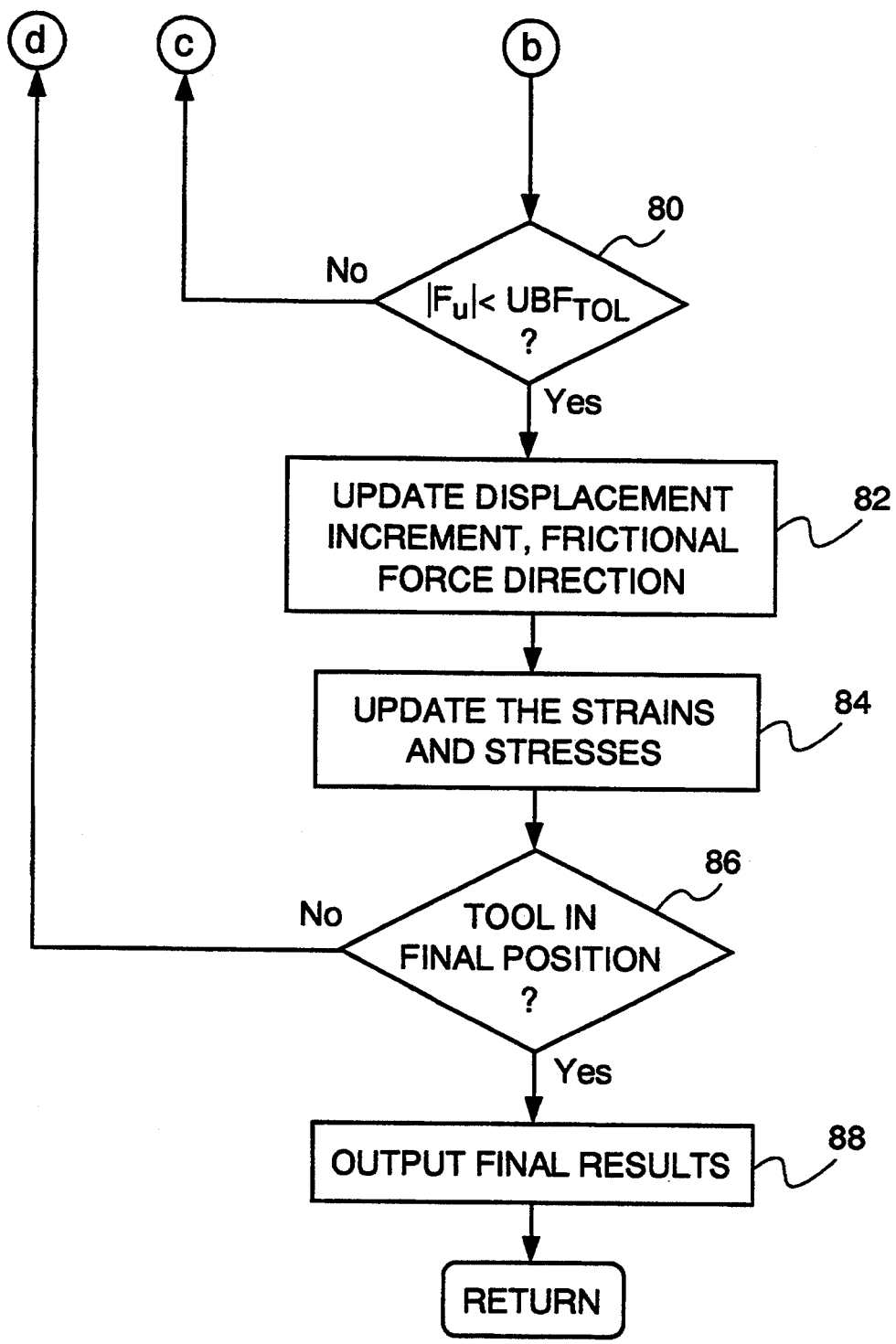

Referring now to FIG. 5c, at step 80 the unbalanced force magnitude $|F_u|$ is compared to UBF$_{TOL}$, a predetermined tolerance. If the unbalanced force is too high, control flow jumps to step 68 of FIG. 5b, as shown. If the unbalanced force is small enough, the total displacement U is updated at step 82 for the next load step as follows:

$$U = U + \Delta U \quad (12)$$

The frictional force direction at each contact node is also updated at step 82 by filtering the relative velocity vector at a contact point. This is done so as to avoid frictional force oscillations due to the change of direction of the relative velocity vector, as shown in FIG. 12, which can cause nonconvergence in the iterative solution of equation (9). In the preferred embodiment, a low pass filter is utilized to filter the relative velocity vector:

$$D(t + \Delta t) = \frac{0.2V}{|V|} + 0.8D(t) \quad (13)$$

wherein $D(\Delta t)$ is initially set equal to $V/|V|$. This D is utilized instead of $V/|V|$ in equation (7) above to compute the frictional force vector. It should be appreciated that this method has another advantage since there is no need to treat a stuck contact node (i.e. $|V|$ close to 0) separately from a sliding contact node. Changing from stuck nodes to slipping nodes, and vice versa, can cause convergence problems as well.

Once the displacement has been updated at step 82, based on the $\Delta U$, the stress and strain are updated according to conventional methods, such as according to the material matrix and the strain increment/displacement increment relationship, respectively. At step 86 the computer determines whether the tool is at its final position. If it is not, control flow returns to step 56 for another load step. If the tool is in its final position, the final results, the predicted post-buckling deformation, are output at step 88.

Referring again to FIG. 3, once the die closure analysis of step 36 is completed, at step 38, the binder surface, draw wall and draw-beads can be redesigned and reconstructed based on predicted sheet metal deformation and stress distribution during die closure so as to prevent failures such as splitting, thinning, permanent buckling and wrinkling of the sheet metal. The present invention is especially effective to treat buckling of the snap-through type.

It is understood that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

We claim:

1. A method for predicting post-buckling deformation of a sheet of metal during a draw forming process, for use with a computer including memory, and sheet metal forming tools including a draw die, a punch and binder having surfaces designed to form the sheet metal into a part, the sheet metal being represented as a mesh including a plurality of nodes, the method comprising:
   applying a displacement increment to the sheet metal nodes;
   identifying a singularity in a tangent stiffness matrix associated with the sheet metal close to the onset of buckling; and
   introducing a plurality of springs at the sheet metal nodes so as to eliminate the singularity and enhance convergence of a numerical solution for the displacement increment to an equilibrium value; and
   reconstructing at least one of the draw die, punch, and binder surfaces based on the predicted deformation.

2. The method of claim 1 wherein the draw die and binder define a punch opening and the draw forming process includes a binder set stage, and wherein the springs are introduced during the binder set stage at all of the sheet metal nodes inside the punch opening.

3. The method of claim 1 wherein the draw die and binder define a punch opening and the draw forming process includes a die closure stage, and wherein the springs are introduced during the die closure stage at the sheet metal nodes experiencing large increments of deflection.

4. The method of claim 3 wherein the large increments of deflection are increments of deflection five times the increment of the draw die and binder movement.

5. The method of claim 1 wherein the nodes at which the springs are introduced are free nodes.

6. The method of claim 1 further comprising releasing the springs after convergence of the numerical solution of the displacement increment.

7. The method of claim 5 wherein the springs have associated spring forces, the tangent stiffness matrix has a spring stiffness, and wherein releasing the springs includes removing the spring forces from the nodes and removing the spring stiffness from the tangent stiffness matrix.

8. The method of claim 7 wherein the spring forces and the spring stiffness are removed simultaneously.

9. The method of claim 5 wherein the springs are released without removing the spring stiffness from the tangent stiffness matrix.

10. The method of claim 9 wherein releasing the springs further comprises establishing a set of linear simultaneous equations for equilibrium at all nodes with springs according to:

$$\lambda_i - \sum_{j=1}^{n} k_j \delta_{ij} \lambda_j = k_i \delta_{0i}$$
$$(i = 1 \ldots n)$$

wherein $\lambda_i$ and $\lambda_j$ represent the vertical force required to release springs $\lambda_i$ and $\lambda_j$ at nodes i and j, respectively, such that there is no constraint or external force acting at nodes i and j, respectively, $\delta_{ij}$ is the vertical deflection at a node i due to a unit vertical force at a node j in referring to the configuration of the sheet metal at that position of the die with all springs in action, $\delta_{0i}$ is the vertical displacement at the node i after the convergence of the iteration while there is a vertical spring at the node i, and n is the total number of springs introduced.

11. A system for predicting post-buckling deformation of a sheet of metal during a draw forming process, for use with sheet metal forming tools including a draw die, a punch and binder having surfaces designed to form the sheet metal into a part, the sheet metal being represented as a mesh including a plurality of nodes, the system comprising:

input means for entering data representing the sheet metal mesh:

a memory for storing the entered data and a predetermined instruction set; and a processor in communication with the input means and the memory for applying a displacement increment to the sheet metal nodes, identifying a singularity in a tangent stiffness matrix associated with the sheet metal close to the onset of buckling, and introducing a plurality of springs at the sheet metal nodes so as to correct for the singularity and enhance convergence of a numerical solution of the displacement increment to an equilibrium value.

12. The system of claim 11 wherein the draw die and binder define a punch opening and the draw forming process includes a binder set stage, and wherein the springs are introduced during the binder set stage at all of the sheet metal nodes inside the punch opening.

13. The system of claim 11 wherein the draw die and binder define a punch opening and the draw forming process includes a die closure stage, and wherein the springs are introduced during the die closure stage at the sheet metal nodes experiencing large increments of deflection.

14. The system of claim 13 wherein the large increments of deflection are increments of deflection five times the increment of tool movement.

15. The system of claim 11 wherein the nodes at which the springs are introduced are free nodes.

16. The system of claim 11 further comprising means for releasing the springs after convergence of the numerical solution of the displacement increment.

17. The system of claim 15 wherein the springs have associated spring forces, the tangent stiffness matrix has a spring stiffness, and wherein the means for releasing the springs includes means for removing the spring forces from the nodes and removing the spring stiffness from the tangent stiffness matrix.

18. The system of claim 17 wherein the spring forces and the spring stiffness are removed simultaneously.

19. The system of claim 15 wherein the tangent stiffness matrix has a spring stiffness and wherein the springs are released without removing the spring stiffness from the tangent stiffness matrix.

20. The system of claim 19 wherein the means for releasing the springs further comprises means for establishing a set of linear simultaneous equations for equilibrium at all nodes with springs according to:

$$\lambda_i - \sum_{j=1}^{n} k_j \delta_{ij} \lambda_j = k_i \delta_{0i}$$
$$(i = 1 \ldots n)$$

wherein $\lambda_i$ and $\lambda_j$ represent the vertical force required to release springs $\lambda_i$ and $\lambda_j$ at nodes i and j, respectively, such that there is no constraint or external force acting at nodes i and j, respectively, $\delta_{ij}$ is the vertical deflection at a node i due to a unit vertical force at a node j in referring to the configuration of the sheet metal at that position of the die with all springs in action, $\delta_{0i}$ is the vertical displacement at the node i after the convergence of the iteration while there is a vertical spring at the node i, and n is the total number of springs introduced.

* * * * *